United States Patent [19]

Ekstrand

[11] Patent Number: 4,668,906
[45] Date of Patent: May 26, 1987

[54] SWITCHED RESISTOR REGULATOR

[76] Inventor: John P. Ekstrand, 3507 Laguna Ave., Palo Alto, Calif. 94306

[21] Appl. No.: 754,036

[22] Filed: Jul. 11, 1985

[51] Int. Cl.[4] ............................................. G05F 1/656
[52] U.S. Cl. .................................... 323/297; 323/354; 323/370; 363/84
[58] Field of Search ................ 323/293, 297, 352–354, 323/364, 369, 370; 363/84, 86

[56] References Cited

U.S. PATENT DOCUMENTS

| | | | |
|---|---|---|---|
| 1,892,215 | 12/1932 | Mathieu | 323/297 |
| 3,430,127 | 2/1969 | Weiss | 323/293 |
| 3,546,573 | 12/1970 | Coccia | 323/297 X |
| 3,898,593 | 8/1975 | Qureshi | 323/354 X |
| 4,016,485 | 4/1977 | Samorodov et al. | 323/293 |

OTHER PUBLICATIONS

Davis et al., "Low-Voltage AC Hg Arc Lamp Power Supply", IBM Technical Disclosure Bulletin, vol. 18, No. 2, Jul. 1975, pp. 596–597.

Primary Examiner—Peter S. Wong

[57] ABSTRACT

A switched resistor regulator controls current flow through a resistor electrically connected to a load by varying the duty cycle of switching the resistor into electrical connection between of a power source and the load to regulate the power to the load. Both current and voltage regulation can be achieved. In a series switched configuration, current flow through a resistor in series with the load is controlled with current flow being maintained by a capacitor is parallel with the load when the resistor is switched off. In a shunt switched configuration current flow through a resistor in parallel with the load is controlled, with a capacitor parallel to the load also being used. In a hybrid configuration a shunt switched resistor is used while the current level to the load is changed by selecting one of several series resistors; a capacitor is also provided parallel to the load. In a switched resistor passbank configuration a series switched resistor is used with a capacitor connected in series with the load and parallel to the switched series resistor.

23 Claims, 5 Drawing Figures

SWITCHED RESISTOR REGULATOR

BACKGROUND OF THE INVENTION

The invention relates generally to power supplies and more specifically to regulated power supplies, particularly switching regulators.

One particular application for regulated power supplies is ion laser power supplies. The important factors are weight, speed, complexity, reliability and conducted emissions. Thus, a simple, inexpensive, compact and light weight design is particularly advantageous for use in an ion laser.

The following have been utilized in ion laser power supplies. A magnetic amplifier is reliable but heavy. A motor generator set is heavy and noisy. A carbon pile is erratic. A motor driven Variac has brush problems. A buck boost transformer is heavy and requires manual tap changes. Phase controlled rectifiers include complex gate drive circuits and produce conducted emissions. Series pass transistors require many power semiconductors and are expensive to build. The standard switching regulator is efficient but includes expensive magnetics and complex snubbing. Thus, none of the available types of power supplies are ideal for an ion laser.

Accordingly, it is an object of the invention to provide an improved switching regulator.

It is also an object of the invention to provide a regulated power supply for an ion laser.

It is another object of the invention to provide a regulated power supply which is simple, inexpensive, light weight and compact in design.

SUMMARY OF THE INVENTION

The invention is a switched resistor regulator. The average current flow through a fixed resistor is varied by switching the resistor in and out of the circuit, i.e., the duty cycle of the current flow through the resistor is controlled. A power transistor is preferably used as the switch. Alternate preferred embodiments of the invention include: (1) a series switched resistor configuration in which the current flow through a resistor in series with the load is controlled while a capacitor in parallel with the load maintains load current while the resistor is switched off, (2) a shunt switched resistor configuration in which the current flow through a resistor connected in parallel across the load is controlled; (3) a hybrid switched resistor configuration which combines a shunt switched resistor with selectable series resistors; and (4) a switched resistor passbank configuration having a series switched resistor with a capacitor connected across the series switched resistor.

The advantages of the invention include the small number of power components and the elimination of the need for snubbers (with resulting duty factor limitations) or a free wheeling diode. The invention embodiments are small size, low weight and flexible in configuration. Resistive switching is used which is easy to accomplish and does not adversely affect circuit operations; only the difference between supply and load voltage instead of full supply voltage appears across the switch (transistor) so there is low stress on the switch. Built in fault current limiting occurs since there is always a resistor in series with the load. The switching regulator can operate over a wide range of frequencies, including audible frequencies, since there is no inductor to produce noise. The invention may be operated from a 1-phase power source with a large L-C filter because it is not a negative resistance load. Low conducted emissions are produced by the regulator since high frequency currents do not flow through the input filter capacitor. The invention also can dissipate a lot of power by putting losses into water using immersion heaters for the switched resistors and can be applied to higher power levels without increasing the number of components.

DETAILED DESCRIPTION OF THE PREFERRED EMBODIMENTS

The invention is method and apparatus for regulating power from a supply means to a load by switching a resistive means in and out of electrical connection between the supply means and the load with a controlled duty cycle. The resistive means can be connected between the supply means and the load in different ways as will be further described with respect to the four alternate configurations shown in FIGS. 1-4. The regulator is primarily a current regulator since by switching the resistive means in and out of the circuit, the current to the load is controlled; voltage regulation can also result. A capacitor is also connected to the load, either parallel to the load or across a series switched resistor, to maintain current flow when the resistive means is switched out of the circuit. Regulation is thus accomplished by controlling dissipation of power in the resistive means with a longer duty cycle providing more power dissipation in the resistive means; thus regulation is produced by introducing resistive losses into the circuit.

Figure 1:
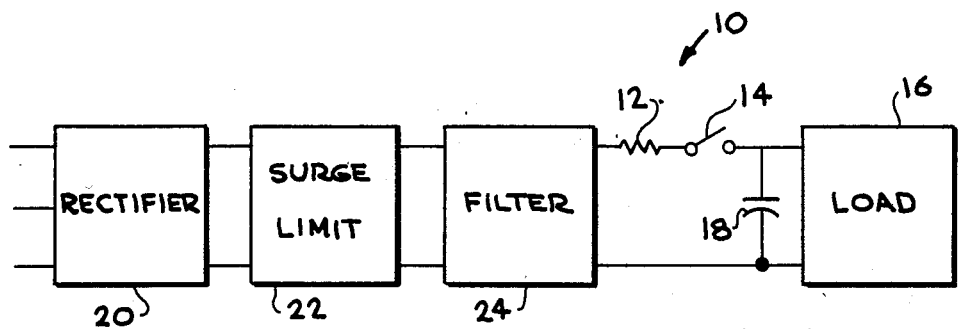
FIG. 1 is a schematic/block diagram of a series switched resistor regulator.

A series switched resistor regulator 10, as shown in FIG. 1, has a fixed resistor 12 connected through switch 14 to load 16 and to capacitor 18 which is connected in parallel across load 16. The input to resistor 12 may be produced by a variety of other circuits; as shown the input is a rectified filtered voltage formed by passing a source voltage through a rectifier 20, a surge limit circuit 22, and a filter 24 connected in series between the source voltage and resistor 12. The source voltage as shown is provided by a three-line input to rectifier 20, however, any other voltage supply means can be utilized. Filter 24 may be an R-C or L-C filter.

The regulator 10 operates by opening and closing switch 14 repetitively; the duty cycle of switch 14 is controlled to vary the current through the resistor 12 to maintain a constant current or voltage to load 16. The switching frequency is sufficiently high so that capacitor 18 remains sufficiently charged to provide a voltage across load 16 when switch 14 is open to maintain current flow to the load.

The series switched resistor regulator 10 provides constant input line current for varying input line voltage. However, high peak switching currents may occur, depending on the input line voltage range and the ratio of resistance 12 to the resistance of load 16. The switch 14 should have a current capability of approximately 4-8 times the load current. Peak currents may produce some ripple in capacitor 18. Multiphase switching operation is more effective than single phase switching, i.e. multiple switched resistors driven out of phase to increase ripple frequency and reduce ripple current in the capacitor.

Figure 2:
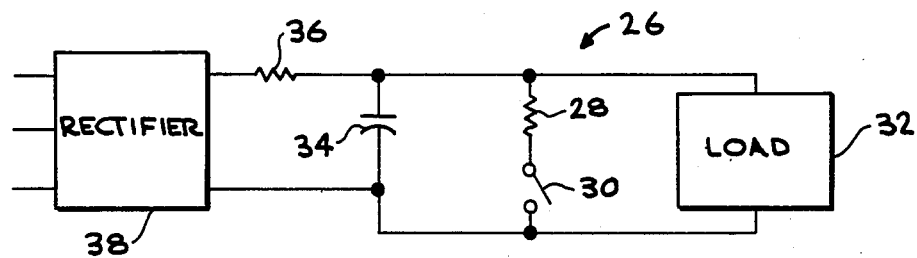
FIG. 2 is a schematic/block diagram of a shunt switched resistor regulator.

A shunt switched resistor regulator 26, as shown in FIG. 2, has a fixed resistor 28 and series switch 30 connected in parallel across load 32. Also connected across load 32 and across resistor 28 and switch 30 is a capacitor 34. An input voltage is passed through rectifier 38 and the rectified signal is passed through a fixed resistor 36 which is connected in series with the load; resistor 36 is also connected in series with resistor 28 and switch 30 and also with capacitor 34. Regulator 26 operates by repetitively opening and closing switch 30 to add or remove resistor 28 from the circuit. When resistor 28 is removed from the circuit (switch 30 open) more current flows to load 32; when resistor 28 is connected to the circuit (switch 30 closed) current is divided between resistor 28 and load 32, depending on the relative values of the resistances, so less current flows to load 32. The duty cycle of switch 30 is controlled to provide proper regulation of the current and voltage to load 32. Resistor 36 is always in series with load 32 to limit the maximum current to the load 32. Capacitor 34 remains sufficiently charged to maintain a voltage across the load 32. Capacitor 34 and resistor 36 form an R-C filter to filter the rectified signal from rectifier 38.

In the shunt switched resistor regulator 26, peak switching capability is approximately half the operating current for fixed current operation. No L-C filter or surge limiting is required as in the series switched regulator, and lower conducted emissions are produced. However, the efficiency of the shunt switched resistor regulator is lower than the series switched regulator particularly for wide current control range and input line current changes with input line voltage.

Figure 3:
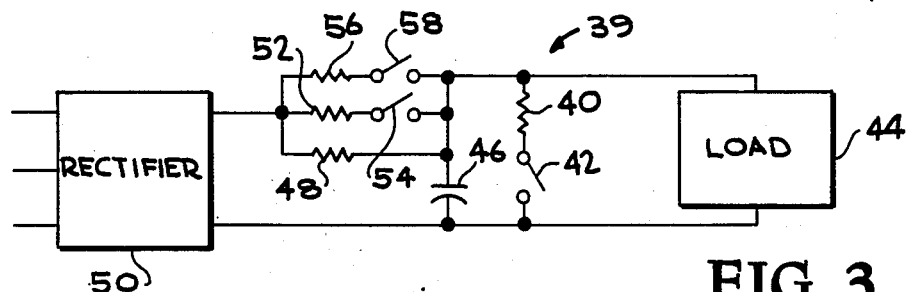
FIG. 3 is a schematic/block diagram of a hybrid switched resistor regulator.

A hybrid switched resistor regulator 39, as shown in FIG. 3, combines a shunt switched resistor with selectable series resistors. A shunt resistor 40 and series switch 42 are connected across load 44. Capacitor 46 is also connected in parallel with the load 44 and with resistor 40 and switch 42. Load 44 is connected through series resistor 48 to rectifier 50 which supplies a rectified voltage signal to the load 44. A first series resistor 52 and its series switch 54 are connected in series between rectifier 50 and load 44, parallel to resistor 48. A second series resistor 56 and its series switch 58 are also connected in series between rectifier 50 and load 44 also parallel to resistor 48. The purpose of the first and second series switched resistors 52, 56 is to select the current level. In operation, resistor 40 is switched in and out of the circuit, as a shunt switched regulator, to provide desired voltage regulation to load 44. The switching duty cycle of the switch 42 is controlled. The series resistors 52, 56 are used, in combination with resistor 48, to select the current level and to get within range of the shunt regulator in which shunt resistor 40 is switched rapidly (at a high frequency) to remove ripple and noise. By adding either or both of resistors 52, 54 in parallel to resistor 48, the total resistance is decreased so the input current level is increased. Switches 54 and 58 are not the same type of switches as switch 42 since their functions are totally different; switch 42 is used for rapid switching of resistor 40 with controlled duty cycle to provide regulation while switches 54, 58 are only used to change the total series resistance to the load. By switching the series resistors 52, 56 only when necessary to change current level, conducted emissions and capacitor ripple problems are reduced and the filter and surge limiting circuit are eliminated. Input line current would remain more constant. The capacitor 46 remains substantially charged during the switching and forms with resistor 48 an R-C filter between rectifier 50 and load 44.

Figure 4:
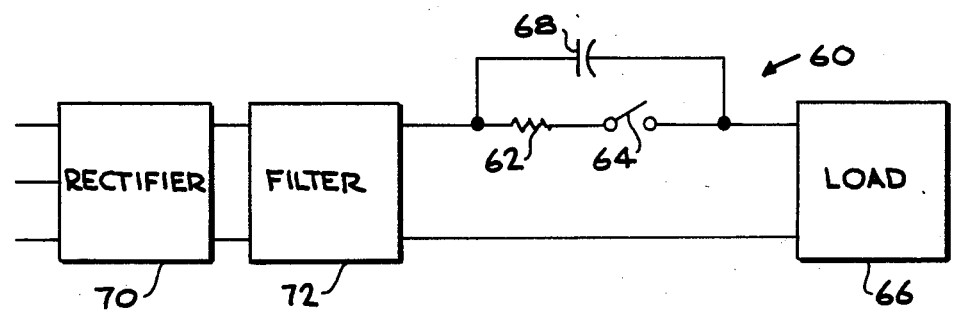
FIG. 4 is a schematic/block diagram of a switched resistor passbank regulator.

A switched resistor passbank regulator 60, as shown in FIG. 4, utilizes a resistor 62 and switch 64 connected in series with load 66. Capacitor 68 is connected across the resistor 62 and switch 64 and functions to maintain current flow through load 66 when switch 64 is open. The input to resistor 62 is provided by any power supply means and conditioned by any additional circuits as desired, e.g., a rectified filtered voltage formed by passing a source voltage through a rectifier 70 and a filter 72 connected in series between an input line and resistor 62. Filter 72 may be an L-C or R-C filter. In operation the duty cycle of switch 64 is controlled to vary the current through resistor 62 to regulate the current and voltage to load 66. Capacitor 68 maintains current flow to the load 66 when switch 64 is open. Since capacitor 68 is in series with load 66 a lower voltage capacitor can be used than the parallel capacitor used in the series switched regulator; only the difference between source and load voltage appears across capacitor 68. The passbank configuration also produces low conducted emissions and constant line current since switched resistor current does not go back to the source.

Although various types of switches can be utilized, the switches 14, 30, 42, and 64 are preferably power transistors, either bipolar or MOS. Gate turnoff thyristors could also be used, as well as SCR's or even electro-mechanical switches such as brushes. The switches may be operated at constant frequency and the duty cycle is controlled from 0-100%. The switch is preferably operated at a frequency that produces low losses; a typical frequency is 10 kHz. The power transistors are switched on and off by conventional control circuitry providing a pulse width modulated input to the base of the transistor, as is further illustrated by tne circuit of FIG. 5. The control circuitry may be implemented with integrated circuits.

Although the invention can be used in power supplies for many applications, the switched resistor regulators are particularly useful for nearly constant voltage loads, e.g., discharge or arc lamps or laser tubes. Thus, the invention can be utilized in a power supply for lasers, specifically ion lasers or YAG lasers. In a switched resistor regulator power supply for ion lasers, immersion heaters may be used as the resistors in order to dissipate a lot of heat, which may be removed by water cooling, and motor control transistors for the switches.

Figure 5:
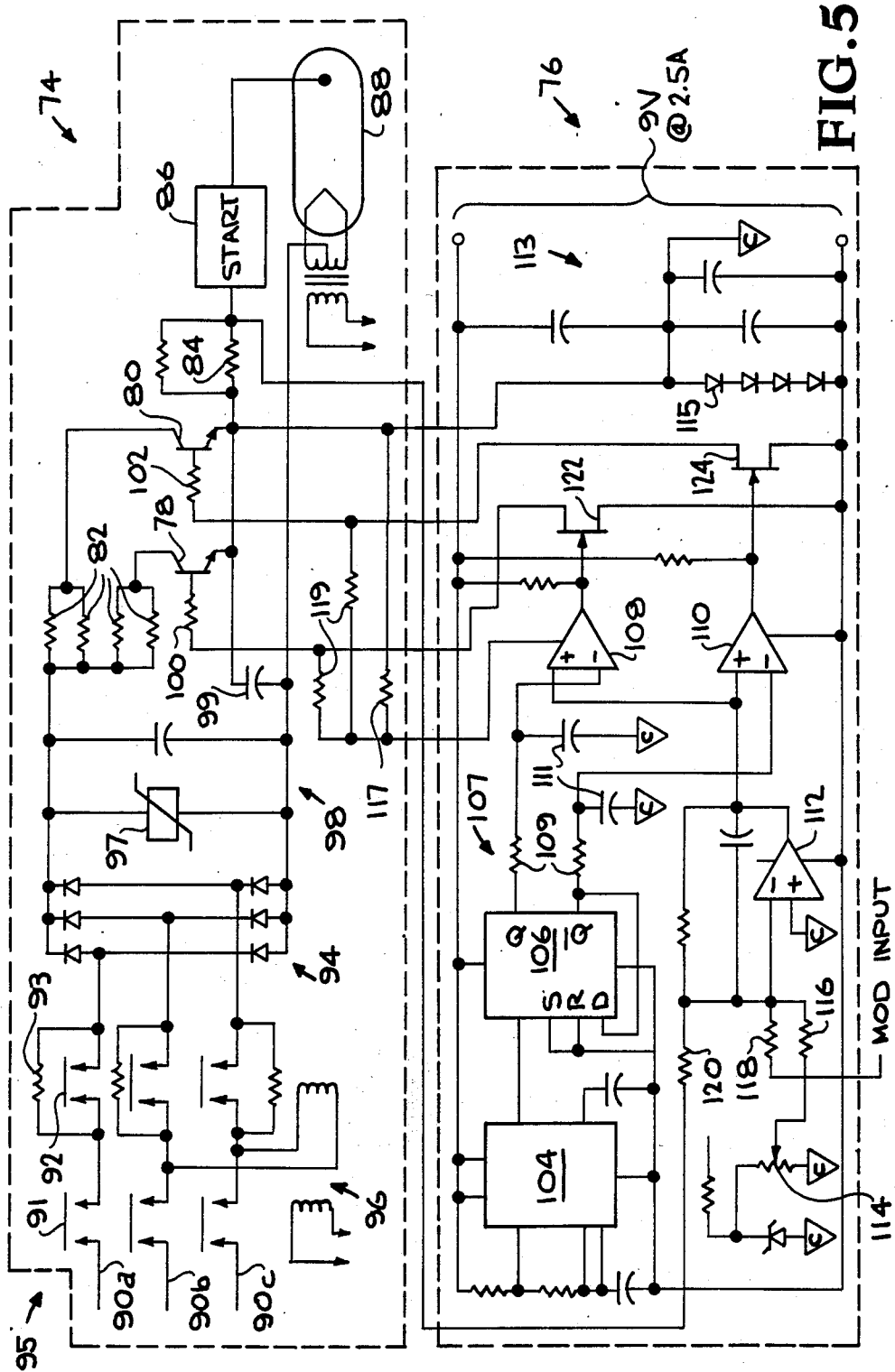
FIG. 5 is a schematic of a series switched resistor regulator for an ion laser power supply.

An embodiment of a series switched regulator 74, including control circuit 76, is illustrated schematically in FIG. 5. The series switched regulator 74 includes a pair of transistors 78, 80 which are the switches. A pair of switches are used in place of a single switch to provide multiphase switching regulation. Multiple switched resistors are driven out of phase to increase the ripple frequency and decrease the ripple current. Each transistor has a pair of parallel resistors 82 connected to the collectors, and the emitters are connected through a pair of parallel current sensing resistors 84 and start circuit 86 to a laser tube 88 which forms the load (pairs of parallel resistors are used to provide a desired value of resistance from available components). Three input lines 90 a, b, c are each connected through a pair of contactors 91 and 92 to a six-diode rectifier bridge 94 so that a three phase voltage signal can be input. A resistor 93 is in parallel with each pole of contactor 92 forming a surge limit circuit 95. The rectifier bridge 94 provides full wave rectification of the input signal. A varistor 97 is connected across rectifier 94 for transient suppression to protect the diodes. The rectified signal from bridge 94 then passes through an L-C filter 98 connected to rectifier bridge 92. The filtered signal from filter 98 is passed to the resistors 82 and from the resistors 82 to the collectors of transistors 78, 80. A capacitor 99 is also connected across load 88 to maintain current flow through the load when resistors 82 are switched off.

The transistors 78, 80 are off (switch open) when there is reverse voltage applied to the base of transistors 78, 80 and are on (switch closed) when current flows to the base of transistors 78, 80. The bases of transistors 78, 80 are connected to control circuit 76 through resistors 100, 102 respectively.

The control circuit 76 includes an oscillator 104 which clocks a D-flip flop 106. The normal output of flip flop 106 is connected through a triangular waveshaping network 107 to the negative input of comparator 108 while the inverted output is connected through another triangular waveshaping network 107 to the negative input of comparator 110. The triangular waveshaping networks 107 are formed of resistors 109 and capacitors 111 and change the square waveforms from flip flop 106 to triangular waveforms which are input to comparators 108, 110. The output of amplifier 112 is input into the positive inputs of both comparators 108, 110. Three signals are combined at one input (negative) of amplifier 112. A reference input from potentiometer 114 through resistor 116, an external modulation input through resistor 118, and a feedback signal through resistor 120 from current sensing resistors 84. The external modulation input can be used to electronically change the current. The outputs of comparators 108, 110 are connected to the gates of field effect transistors (FETS) 122, 124 respectively. Depending on the output of amplifier 112, since there is a triangular wave input to comparators 108, 110 the drive signal to FETs 122, 124 is pulse width modulated from 0-100% so the duty cycle of the switching resistors is controlled from 0-100%. In the two phase scheme shown, both transistors 78, 80 may be on or off at any time, or one can be on and one off. The output of FET 122 is connected through resistor 100 to the base of transistor 78; the output of FET 124 is connected through resistor 102 to the base of transistor 80. The control circuit 76 is connected to suitable power supply means, e.g., 9V @ 2.5A supply, through a capacitor bridge circuit 113 which splits up the supply voltage; diodes 115 provide a fixed voltage drop to ground. A voltage is applied through resistor 117 and one of resistors 119 to resistors 100, 102 and the bases of transistors 78, 80. When one of FETs 122, 124 is off, the current to the base of corresponding transistor 78, 80 will flow; when the FET is on, current is shunted from the base of the transistor.

Changes and modifications in the specifically described embodiments can be carried out without departing from the scope of the invention which is intended to be limited only by the scope of the appended claims.

I claim:

1. Apparatus for regulating power from a power supply means to a load comprising:
   resistive means and capacitive means electrically connected between the power supply means the load, the resistive means including at least a switching resistor;
   switching means connected in series with the switching resistor for opening and closing the electrical connection through the switching resistor in the resistive means from the supply means to the load, the resistive means having a resistor in series between the supply means and the load when the switching means is closed, the capacitive means having a capacitor electrically connected to the load when the switching means is open;
   control means connected to the switching means for opening and closing the switching means at a frequency and duty cycle to selectably vary average current flow through the switching resistor to regulate current flow to the load.

2. Apparatus of claim 1 wherein the resistive means comprises a switching resistor connected in series between the power supply means and the load, and the capacitive means comprises a capaictor connected in parallel across the load.

3. Apparatus of claim 1 wherein the resistive means comprises a switching resistor connected in parallel to the load and a current limiting resistor connected in series between the supply means and the load, and the capacitive means comprises a capacitor connected in parallel across the load.

4. Apparatus of claim 3 further including at least one current level selection resistor connected in parallel with the current limiting resistor, and current level selection switch means connected in series with each current level selection resistor.

5. Apparatus of claim 1 wherein the resistive means comprises a switching resistor connected in series with the load, and the capacitive means comprises a capacitor connected in parallel across the switching resistor and switching means and in series between the supply means and the load.

6. Apparatus of claim 1 wherein the switching means is a power transistor.

7. Apparatus of claim 1 wherein the control means comprises a pulse width modulator.

8. Apparatus of claim 1 wherein the resistive means comprises a plurality of separate switching resistors connected in parallel and the switching means switches each separate switching resistor out of phase with the others.

9. Apparatus comprising:
   unregulated power supply means;
   a load electrically connected to the power supply means;
   resistive means and capacitive means electrically connected between the power supply means and the load, the resistive means, including at least a switching resistor;
   switching means connected in series with the switching resistor for opening and closing the electrical connection through the switching resistor in the resistive means from the supply means to the load, the resistive means having a resistor in series between the supply means and the load when the switching means is closed, the capacitive means having a capacitor electrically connected to the load when the switching means is open;

control means connected to the switching means for opening and closing the switching means at a frequency and duty cycle to selectably vary average current flow through the switching resistor to regulate current flow to the load.

10. Apparatus of claim 9 wherein the load is a laser tube, a discharge tube, or an arc lamp.

11. Apparatus of claim 9 wherein the resistive means comprises a switching resistor connected in series between the power supply means and the load, and the capacitive means comprises a capacitor connected in parallel across the load.

12. Apparatus of claim 9 wherein the resistive means comprises a switching resistor connected in parallel to the load and a current limiting resistor connected in series between the supply means and the load, and the capacitive means comprises a capacitor connected in parallel across the load.

13. Apparatus of claim 9 wherein the resistive means comprises a switching resistor connected in series with the load, and the capacitive means comprises a capacitor connected in parallel across the switching resistor and switching means between the supply means and the load.

14. Apparatus of claim 9 wherein the switching means is a power transistor.

15. Apparatus of claim 9 wherein the control means comprises a pulse width modulator.

16. Apparatus of claim 9 wherein the resistive means comprises a plurality of separate switching resistors connected in parallel and the switching means switches each separate switching resistor out of phase with the others.

17. Method for regulating power to a load, comprising:

supplying an unregulated voltage;

applying the unregulated voltage to a resistive means including a switching resistor connected to the load;

switching the switching resistor in and out of electrical connection to the load at a frequency and duty cycle sufficient to maintain a substantially regulated current in the load;

providing a capacitive means in electrical connection to the load when the switching resistor is switched out of electrical connection to the load;

providing a resistor in series with the load when the switching resistor is in electrical connection to the load.

18. Method of claim 17 further including connecting the switching resistor in series with the load, and further including connecting a capacitor in parallel across the load.

19. Method of claim 17 further including connecting the switching resistor in parallel across the load, and further including connecting a capacitor in parallel across the load and connecting a current limiting resistive means in series with the load.

20. Method of claim 19 further comprising selecting the current limiting resistive means to adjust the current level.

21. Method of claim 17 further including connecting the switching resistor in series with the load, and further including connecting a capacitor in parallel across the resistive means.

22. Method of claim 17 further comprising applying the unregulated voltage to a plurality of switching resistors connected in parallel with each other to the load and switching each of the plurality of switching resistors out of phase with the others.

23. Method of claim 17 wherein the switching frequency is about 10 kHz and the duty cycle is controllably varied between 0–100%.

* * * * *